United States Patent Office 3,314,959
Patented Apr. 18, 1967

3,314,959
INTERMEDIATES FOR THE SYNTHESIS
OF ERGOT ALKALOIDS
Albert Hofmann, Bottmingen, Switzerland, and Albert Frey, Essex Fells, and Hans Ott, Convent Station, N.J., assignors to Sandoz Ltd. (also known as Sandoz A.G.), Basel Switzerland
No Drawing. Filed July 26, 1965, Ser. No. 474,947
Claims priority, application Switzerland, May 10, 1961, 5,497/61; Nov. 8, 1962, 13,069/62; Oct. 26, 1964, 13,837/64, 13,838/64
11 Claims. (Cl. 260—268)

The present application is a continuation-in-part of U.S. Serial No. 298,410, filed July 29, 1963, now U.S. Patent No. 3,227,719, granted January 4, 1966, which in turn was a continuation-in-part of U.S. Serial No. 193,303, filed May 8, 1962 and now abandoned.

This invention relates to novel heterocyclic compounds and a process for the manufacture thereof. More particularly, this invention relates to acid addition salts of the general formula

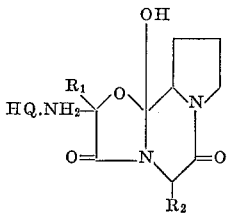

I wherein $R_1$ is a hydrogen atom or an alkyl radical with one to five carbon atoms, $R_2$ is a hydrogen atom, an alkyl radical with one to four carbon atoms or the benzyl radical and Q is an anion of an inorganic or strong-organic acid.

The present invention also provides a process for the production of the acid addition salts of the general Formula I, which can be described as follows: A 2-benzyloxy-malonic acid halide monoalkyl ester of the general formula

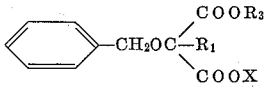

II wherein $R_1$ has the above significance, $R_3$ is a hydrogen atom or an alkyl radical with one to five carbon atoms and X is halogen, is converted with a diketo-piperazine of the general formula

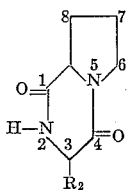

III wherein $R_2$ has the above significance, to form a compound of the general formula

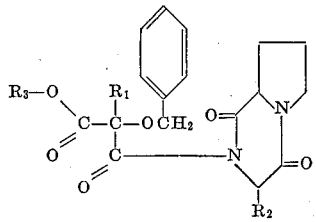

IV wherein $R_1$, $R_2$ and $R_3$ have the above significance. The benzyloxy radical of this compound is then converted to the free hydroxyl radical by hydrogenating a compound of the general Formula IV in glacial acetic acid or alcohol or a mixture of these solvents at a pressure of 2–80 atmospheres in the presence of a palladium catalyst. Spontaneous cyclization occurs to form a compound of general formula

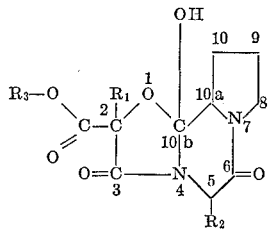

V wherein $R_1$, $R_2$ and $R_3$ have the above significance.

The compound of the general Formula II is used as starting material and the optically pure product is obtained by using an optically active compound II which may be produced in manner known per se.

The 2-benzyloxy-malonic acid halide monoalkyl esters of the general Formula II used as starting material in the process described above can be prepared by saponification of a compound of the general formula

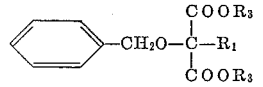

VI wherein $R_1$ and $R_3$ have the above significance, with a quantity of an alcoholic solution of an alkali metal hydroxide, calculated to saponify only one of the $R_3$ radicals, to form the corresponding 2-benzyloxy malonic acid monoalkyl ester, which is converted to the corresponding acid halide by a method known to convert a carboxylic acid to the corresponding acid halide. The 2-benzyloxy malonic acid dialkyl esters of the general Formula VI may be produced by condensing a compound of the general formula

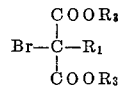

VII wherein $R_1$ and $R_3$ have the above significance, with an alkali metal benzylate.

One specific method of producing compounds of the general Formula I is as follows: The condensation of compound III with compound II is preferably effected by adding compound III dropwise to a solution of compound II in absolute pyridine at −30° whilst stirring well and then leaving the reaction mixture to stand for two days at −10° to +10°. The acylation may also be effected by heating molar quantities of compounds II and III in an inert solvent, e.g. benzene, toluene or dioxane for 5 to 20 hours at 80–100° and adding molar quantities of a tertiary organic base, e.g. pyridine or triethylamine.

If a racemic compound III is used for the condensation, two diastereoisomers result while the optically active base is obtained by using an optically active compound III, which may be produced in manner known per se. A mixture of the diastereoisomer forms of compound IV, may, however, be used in the following stage of the process as the resulting mixture of diastereoisomer compounds V produced in the next stage may easily be separated into its components by crystallization.

The benzyl radical of the resulting compounds IV is then split off by hydrogenating, e.g. catalytically in glacial acetic acid or alcohol or a mixture of both solvents, spontaneous cyclization occurring to form compound V.

The ester group of compounds V is then converted to an amino group by saponifying the ester radical to form the corresponding free acid, converting this to the corresponding acid chloride and subsequently to the corresponding acid azide which may be converted to compound I according to Curtius.

The above mentioned conversion of compound V to form compound I is preferably effected as follows: A compound V is hydrolyzed to the corresponding carboxylic acid by treating with a 1 N aqueous alcoholic potassium hydroxide solution at room temperature, the sodium salt thereof converted with an excess of oxalyl chloride to form the corresponding acid chloride, this is reacted with the calculated quantity of a 30% aqueous solution of sodium azide at room temperature, for example in acetone, whereupon the corresponding acid azide results as a crystalline compound after working up in manner known per se. By heating the acid azide in an inert solvent, e.g. benzene toluene or xylene, for a short time to 80–140°, the corresponding isocyanate is formed in an almost quantitative yield with the evolution of nitrogen. The resulting isocyanate can easily by hydrolysed. Alternatively, the solution of the isocyanate, can be heated with benzyl alcohol to form the corresponding urethane which results in a good yield. The urethane may be hydrogenated in a methanolic mineral acid solution with palladium catalyst at normal pressure to form the salt of the general Formula I.

The compounds I are important intermediate compounds for the synthesis of the natural ergot peptide alkaloids and their derivatives.

In the scheme of synthesis to form compound I, the conversion step in the method which involves the conversion of the ester into the amino group, conversion to the azide via the chloride, and reaction of the azide to form the isocyanate which is thereafter hydrogenated is specially advantageous by virtue of the fact that the peptide rests of the natural ergot alkaloids of the peptide structure are unstable under alkaline or neutral environment.

The ergot alkaloids and some of their synthetic derivatives are of great importance as therapeutics. They not only show uterotonic and vasotonic activity but are used also in a great scale against troubles of the autonomic nervous system. Whilst that constituent of ergot, however, which has an uterotonic activity, i.e. ergobasine (also known as ergometrine or ergonovine), has been prepared synthetically for some time, the ergot alkaloids of the peptide type, ergotamine and the alkaloids of the ergotoxine group, which are used as sedatives, oxytocics and as a most efficient remedy against migraine headache, have only been obtainable from the naturally occurring material. Also the 9,10-dihydro-derivatives of ergotamine and of the ergotoxines were only obtainable in a semisynthetic way from the corresponding natural alkaloids. It now has been made possible to produce the ergot alkaloids of the peptide type and their derivatives by reaction of a compound of the formula

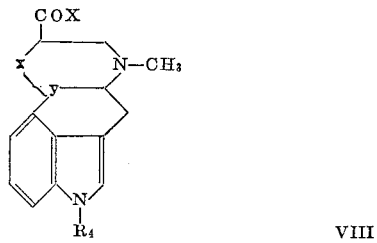

VIII wherein $R_4$ is hydrogen or an alkyl group with 1 to 3 carbon atoms inclusive,

is the group —CH=C< or the group —CH$_2$— C<H and X is a chlorine or bromine atom or the radical —OSO$_3$H, with a salt of the general Formula I.

When a (+)-lysergic acid halide hydrohalide, e.g. (+)-lysergic acid chloride hydrochloride, is used for the reaction, it may be suspended together with the amine salt of the general Formula I in an inert solvent, e.g. chloroform, and a tertiary amine, e.g. tributyl amine, added. The reaction mixture may be concentrated, diluted with a water immiscible solvent, e.g. methylene chloride, chloroform or ethyl acetate, and the basic constituents removed by shaking with a dilute aqueous solution of an organic acid, e.g. acetic acid or tartaric acid. Subsequently the aqueous solution may be made alkaline and extracted with an organic solvent (e.g. ethyl acetate or ether), the extract dried and the solvent evaporated. The resulting crude product may subsequently be purified by chromatography on aluminium oxide and subsequent crystallization. When the anhydride of (+)-lysergic acid or (+)-9,10-dihydrolysergic acid with sulfuric acid is used for the reaction, it is produced in situ by reacting (+)-lysergic acid or (+)-9,10-dihydrolysergic acid with sulphuric acid. The resulting anhydride is then reacted with the amine salt of the general Formula I. In this particular process a suspension of the amine salt and the calculated quantity of a tertiary base in dimethyl formamide may be added to a freshly prepared solution of the anhydride in dimethyl formamide at 0° and the reaction mixture may be further worked up as described above.

The (+)-lysergic acid halide hydrohalides (described and claimed in our U.S. Patent No. 3,084,164) may, for example, be produced as follows: Finely divided (+)-lysergic acid is suspended in freshly distilled phosphorus oxyhalide and freshly sublimated, finely pulverized phosphorus pentahalide is added while stirring. The reaction mixture is shaken at room temperature and then heated to 90°. The phosphorus oxyhalide is then evaporated off in a water jet vacuum and the remaining grey powder washed twice with hexane. To produce the natural ergot alkaloids, e.g. (+)-ergotamine, in accordance with the above process, it is necessary to use an amine salt I the configuration of which corresponds to the peptide portion of the natural ergot alkaloids to be produced. Should other amine salts be used, compounds having a similar structure but differing in the configuration at one or more of the asymetric centers, result.

The following examples describe in detail compounds illustrative to the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure.

Throughout the examples hereinafter set forth, temperatures are given in degrees centigrade and relative amounts of materials in parts by weight, except as otherwise noted.

*Example 1.*—2 - amino-2-methyl-5-benzyl-10b-hydroxy-3,6 - dioxo-octahydro-oxazolo[3,2 - a]pyrrolo[2,1 - c] pyrazine-chlorohydrate (a) *2-benzyloxy-2-methyl-malonic acid diethylester.*—44.3 g. of a sodium hydride suspension (50%) in oil are suspended in 1.25 litres of toluene and 91.3 g. of benzyl alcohol are added dropwise at room temperature whilst stirring and the mixture then boiled at reflux for 1 hour. 214.8 g. of 2-bromo-2-methyl-malonic acid diethylester are then added dropwise to the cooled solution and the reaction mixture is boiled at reflux for a further 2 hours, then poured onto ice, the mixture made acidic with dilute hydrochloric acid and extracted with ether. The etheral solution is washed consecutively with water, a sodium bicarbonate solution and a saturated solution of sodium chloride. After evaporation in a vacuum the 2-benzyloxy-2-methyl-malonic acid diethylester results as a yellowish oil having a boiling point of 120–125° at 0.01 mm. of Hg.

(b) *2-benzyloxy-2-methyl-malonic acid chloride monoethylester.*—181.3 g. of crude 2-benzyloxy-2-methyl-malonic acid diethylester are dissolved in 693 cc. of absolute alcohol at room temperature and a solution of 36.4 g. of potassium hydroxide in 450 cc. of absolute alcohol is added whilst cooling with ice. The reaction solution is left to stand for 15 hours at room temperature and then evaporated in a vacuum at a bath temperature of 40°, the residue taken up in a mixture of 500 cc. of a concentrated NaHCO₃ solution and 500 g. of ice, extracted with ether and made acid with an ice cold 10% phosphoric acid and the separated oil taken up in methylene chloride. After evaporation of the solvent in a vacuum the crude 2-benzyloxy-2-methyl-malonic acid monoethyl ester remains as a yellow oil. 320 cc. of thionyl chloride are added to 265.6 g. of 2-benzyloxy-2-methyl-malonic acid monoethyl ester and the mixture is boiled at reflux for 2 hours. The excess thionyl chloride is then distilled off in a vacuum and the residue distilled in a high vacuum. The resulting 2-benzyloxy-2-methyl-malonic acid chloride monoethyl ester has a boiling point of 138–141° at 0.03 mm. of Hg. $n_D^{20}=1.5150$.

(c) *2-(2 - benzyloxy - 2 - methyl-0-ethyl-malonyl)-3-benzyl - 1,4 - diketo-octahydro-pyrrolo[1,2-a]-pyrazine.*—A solution of 92.5 g. of 3-benzyl-1,4-diketo-octahydro-pyrrolo[1,2-a]-pyrazine (produced from L-phenylalanine and L-proline) in 580 cc. of absolute pyridine is cooled to −30° and 95.5 g. of 2-benzyloxy-2-methyl-malonic acid chloride monoethyl ester are added dropwise whilst stirring. The reaction is left to stand for 15 hours at 0° and 100 cc. of water are added, the mixture is stirred for a further half hour at 0° and then poured onto ice, made acid to Congo red indicator with an 18% hydrochloric acid and extracted a number of times with methylene chloride. The organic extracts are washed consecutively with a 2 N hydrochloric acid, water and a concentrated sodium bicarbonate solution, dried with sodium sulphate and the solvent removed in a vacuum. The residue is taken up in ether, the ethereal solution washed well a number of times with water, dried again and evaporated in a vacuum, the 2-(2-benzyloxy-2-methyl - 0 - ethyl - malonyl)-3-benzyl-1,4-diketo-octahydro-pyrrolo[1,2-a]-pyrazine resulting as a light yellow oil. This is a diastereoisomer mixture of the D,L,L- and L,L,L-compound as the optically active 3-benzyl-1,4-diketo - octahydro - pyrrolo[1,2-a]-pyrazine was converted with D,L - 2 - benzyloxy-2-methyl-malonic acid chloride monoethyl ester. The two isomers may be separated by chromatography on silica gel with a mixture of chloroform containing 0.5% of methanol. However, it is advantageous to convert the mixture further as the two isomer cycloesters of the following stage may be separated by crystallization.

(d) *2-ethoxy carbonyl-2-methyl-5-benzyl-10b-hydroxy-3,6 - dioxo-octahydro-oxazolo[3,2-a]pyrrolo[2,1-c]pyrazine.*—A solution of 146 g. of 2-(2-benzyloxy-2-methyl-0 - ethyl - malonyl) - 3 - benzyl - 1,4 - diketo-octahydropyrrolo[1,2-a]-pyrazine in 500 cc. of glacial acetic acid is added to a suspension of 145 g. of pre-hydrogenated palladium (5%) on aluminium oxide in 500 cc. of glacial acetic acid. By shaking over night in an atmosphere of hydrogen approximately 10 litres of hydrogen are taken up. The catalyst is then filtered off and the solution evaporated in a vacuum. The oily residue is taken up in methylene chloride, the solution washed a number of times with water and dried over sodium sulphate. After evaporation of the solvent a colourless oil results from which the 2 - ethoxycarbonyl - 2 - methyl - 5 - benzyl-10b - hydroxy - 3,6 - dioxo-octahydro-oxazolo[3,2-a]pyrrolo[2,1-c]pyrazine, isomer B, crystallizes upon the addition of a little ethyl acetate. Melting point 202–204°, $[\alpha]_D^{20}=-35°$ ($c=1$ in pyridine). The mother liquor is again evaporated so that an oil forms and recrystallized from a little ethyl acetate. Isomer A, melting point 135–136°, $[\alpha]_D^{20}=-34°$ ($c=0.2$ in pyridine).

(e) *2-carboxy - 2 - methyl-5-benzyl-10b-hydroxy-3,6-dioxo - octahydro-oxazolo[3,2 - a]pyrrolo[2,1 - c]pyrazine.*—65 cc. of a 1 N sodium hydroxide solution are added to 10 g. of a 2-ethoxycarbonyl-2-methyl-5-benzyl-10b - hydroxy - 3,6 - dioxo-octahydro-oxazolo[3,2-a]pyrrolo[2,1-c]pyrazine. The clear solution is left to stand at room temperature for two hours and 65 cc. of a 1 N hydrochloric acid are added whilst cooling with ice and the mixture left to crystallize at 0°. 2-carboxy-2-methyl-5 - benzyl - 10b - hydroxy - 3,6 - dioxo-octahydro-oxazolo[3,2-a]pyrrolo[2,1-c]pyrazine results. Isomer A: melting point 120–122°, $[\alpha]_D^{20}=-10°$ ($c=0.2$ in pyridine). Isomer B: melting point 201–202° (decomposition), $[\alpha]_D^{20}=-42°$ ($c=1$ in pyridine).

(f) *2 - chlorocarbonyl - 2 - methyl - 5-benzyl-10b-hydroxy - 3,6 - dioxo - octahydro-oxazolo[3,2-a]pyrrolo[2,1-c]pyrazine*—1.115 g. of sodium and then 17.4 g. of 2-carboxy - 2 - methyl-5-benzyl-10b-hydroxy-3,6-dioxo-octahydro-oxazolo[3,2-a]pyrrolo[2,1-c]pyrazine are dissolved in 224 cc. of absolute methanol whilst cooling with ice until the solution is clear and the solution is then evaporated to dryness in a vacuum. The residue is dried in a high vacuum for 1 hour at 100° and suspended in 150 cc. of oxalyl chloride whilst cooling with ice and the dispersion then stirred well at 0° for half an hour and at room temperature for 1 hour. The excess oxalyl chloride is then distilled off in a vacuum, the residue taken up in absolute methylene chloride, the solution thereof, again evaporated to dryness and the resulting 2-chlorocarbonyl-2 - methyl - 5 - benzyl-10b-hydroxy-3,6-dioxo-octahydro-oxazolo[3,2-a]pyrrolo[2,1-c]pyrazine recrystallized from ether. Isomer A: melting point 125–126°. Isomer B: melting point 173–174°, $[\alpha]_D^{20}=+14°$ ($c=0.5$ in CHCl₃).

(g) *2 - azidocarbonyl-2-methyl-5-benzyl-10b-hydroxy-3,6 - dioxo - octahydro-oxazolo[3,2-a]pyrrolo[2,1-c]prazine.*—12 g. of 2-chlorocarbonyl-2-methyl-5-benzyl-10b-hydroxy - 3,6-dioxo-octahydro-exazolo[3,2-a]pyrrolo[2,1-c]pyrazine are dissolved in 500 cc. of acetone and a solution of 2.58 g. of sodium azide in 8 cc. of water is added dropwise whilst stirring. The reaction mixture is then stirred vigorously for 1 hour, the solution evaporated in a vacuum, the residue stirred into 1000 cc. of water and the aqueous solution extracted with methylene chloride. After evaporation of the solvent the 2-azidocarbonyl - 2 - methyl-5-benzyl-10b-hydroxy-3,6-dioxo-octahydro-oxazolo[3,2-a]pyrrolo[2,1-c]pyrazine results. Isomer A: melting point approximately 100° (decomposition) $[\alpha]_D^{20}=-42°$ ($c=0.3$ in pyridine). Isomer B: melting point approximately 130° (decomposition). $[\alpha]_D^{20}=+24°$ ($c=1$ in CHCl₃).

(h) *2 - isocyano - 2-methyl-5-benzyl-10b-hydroxy-3,6-dioxo - octahydro - oxazolo[3,2-a]pyrrolo[2,1-c]pyrazine (isomer B).*—193 mg. of 2-azidocarbonyl-2-methyl-5-benzyl - 10b-hydroxy-3,6-dioxo-octahydro-oxazolo[3,2-a]pyrrolo[2,1-c]pyrazine are heated in 2 cc. of toluene for 4 minutes to 130° with the formation of nitrogen. Upon cooling the 2-isocyano-2-methyl-5-benzyl-10b-hydroxy-3,6 - dioxo-octahydro-oxazolo[3,2-a]pyrrolo[2,1-c]pyrazine crystallizes from the solution in an almost quantitative yield. Melting point 153–154° in an evacuated tube. $[\alpha]_D^{20}=+45°$ ($c=1$ in CHCl₃).

(i) *2 - benzyloxycarbonyl - 2 - methyl - 5-benzyl - 10b-hydroxy - 3,6 - dioxo - octahydro-oxazolo[3,2-a]pyrrolo[2,1-c]pyrazine.*—872 mg. of 2 - azidocarbonyl-2-methyl-5 - benzyl - 10b - hydroxy-3,6-dioxo-octahydro-oxazolo[3,2-a]pyrrolo[2,1-c]pyrazine in 5 cc. of absolute benzyl alcohol are heated for 5 minutes to 130° accompanied by a strong evolution of nitrogen. The excess benzyl alcohol is subsequently evaporated in a high vacuum and the residue recrystallized from ether. Isomer A: melting point 172–174°, $[\alpha]_D^{20} = -4°$ ($c=0.3$ in pyridine). Isomer B: melting point 224–225°, $[\alpha]_D^{20} = -45°$ ($c=1$ in pyridine).

(j) *2 - amino - 2 - methyl-5-benzyl-10b-hydroxy-3,6-dioxo - octahydro - oxazolo[3,2-a]pyrrolo[2,1-c]pyrazine chlorohydrate.*—A solution of 11 g. of 2-benzyloxycarbonyl - amino - 2 - methyl - 5-benzyl - 10b-hydroxy-3,6-dioxo - octahydro - oxazolo[3,2-a]pyrrolo[2,1-c]pyrazine in 200 cc. of a mixture of equal parts of methanol and methylene chloride containing 8 cc. of a methanolic hydrochloric acid (360 mg. HCl per cc.) is added to a suspension of 24 g. of 5% pre-hydrogenated palladium on aluminium oxide in 96 cc. of absolute methanol containing 40 cc. of methylene chloride. The reaction mixture is shaken for 45 minutes at room temperature in an atmosphere of hydrogen, 540 cc. of hydrogen being used. The catalyst is filtered off from the resulting colourless solution, the mixture evaporated in a vacuum and the residue taken up in ether, the chlorohydrate of the amine precipitating as an amorphous powder. The latter is washed three times with absolute ether and then dried over phosphorus pentoxide. The hydrochloride of the 2-amino - 2 - methyl - 5 - benzyl-10b-hydroxy-3,6-dioxo-octahydro - oxazolo[3,2-a]pyrrolo[2,1-c]pyrazine chlorohydrate results Isomer A: melting point range 170–183°. Isomer B: melting point 131–133° (decomposition) (amorphous, light yellow, hydroscopic powder)

Example 2.—(+)-ergotamine (a) *(+)-lysergic acid chloride hydrochloride.*—536 mg. of (+)-lysergic acid are finely suspended in 10 cc. of freshly distilled phosphorus oxychloride and 416 mg. of finely pulverized, freshly sublimated phosphorus pentachloride are added thereto whilst stirring. The reaction mixture is shaken for 2 minutes at room temperature, then heated to 90° and left at this temperature for 2 minutes. The phosphorus oxychloride is then evaporated off in a water jet vacuum and the remaining powder dissolved twice in n-hexane and the solvent again evaporated in a vacuum, so as to remove the volatile impurities azeotropically. The (+)-lysergic acid chloride hydrochloride resulting as a light grey crystalline powder has a melting point of 310–315° in an evacuated tube.

(b) *(+)-lysergic acid sulphuric acid anhydride.*—212 mg. of lithium hydroxide are added to a solution of 1.43 g. of (+)-lysergic acid monohydrate in 50 ml. of methanol and the solvent is evaporated in a vacuum. The residue is dissolved in 100 ml. of anhydrous dimethyl formamide, half the solvent is distilled off for the purpose of the azeotropic removal of the remaining water, the resulting anhydrous solution is cooled to 0° and 10 ml. of a 1 molar solution of $SO_3$ in dimethyl formamide quickly added whilst stirring. The resulting solution of the anhydride is immediately used for further reaction.

(c) *(+)-ergotamine.*—The (+)-ergotamine is obtained in the shape of prisms from 570 mg. of 2-amino-2-methyl - 5 - benzyl - 10b - hydroxy - 3,6-dioxo - octahydro - oxazolo[3,2 - a]pyrrolo - [2,1 - c]pyrazine chlorohyrate (isomer A) and 570 mg. of (+)-lysergic acid chloride hydrochloride in a manner analogous to that described in Example 3b. Melting point approximately 180°, $[\alpha]_D^{20} = -158°$ ($c=0.5$ in chloroform).

(d) *(+)-ergotamine.*—The solution of the (+)-lysergic acid sulphuric acid anhydride in dimethyl formamide obtained according to sub-section b is cooled to 0° and a suspension of 7 g. of 2-amino-2-methyl-5-benzyl-10b - hydroxy-3,6-dioxo-octahydro-oxazolo[3,2-a]pyrrolo [2,1-c]pyrazine chlorohydrate (isomer A) in 30 cc. of dimethyl formamide is added. 5 ml. of tributyl amine are added dropwise at 0°, the mixture is stirred for a further 10 minutes at 0°, 100 ml. of water and 50 ml. of a saturated aqueous sodium chloride solution are subsequently added and the ergotamine extracted by shaking 10 times, each time with 50 ml. of ethyl acetate. The combined ethyl acetate extracts are shaken 5 times, each time with 50 ml. of a 50% aqueous acetic acid solution, the combined aqueous extracts made alkaline with $NaHCO_3$ and again extracted with ethyl acetate. The organic phase is dried over sodium sulphate and evaporated. By chromatographing the evaporation residue on aluminium oxide and crystallization from aqueous acetone, pure ergotamine results in the shape of prisms having a melting point of 180°.

Example 3.—(+)-9,10-dihydroergotamine (a) *9,10 - dihydro - (+) - lysergic acid chloride.*—The hydrochloride of 9,10-dihydro-(+)-lysergic acid chloride having a melting point of 325–330° (decomposition) is produced from 9-10-dihydro-(+)-lysergic acid in a manner analogous to that described in Example 2a.

(b) *9,10-dihydro-(+)-ergotamine.*—1 g. of 2-amino-2-methyl - 5 - benzyl - 10b - hydroxy-3,6-dioxo-octahydro-oxazolo[3,2-a]pyrrolo[2,1-c]pyrazine chlorohydrate (isomer A) and 1 g. of 9,10-dihydro-(+)-lysergic acid chloride hydrochloride are suspended in 50 cc. of a mixture of chloroform and tertiary butanol (3:1) and a solution of 1.6 g. of tributyl amine in 50 cc. of the same solvent mixture is added dropwise, the mixture is stirred at room temperature for 15 minutes, the solvent evaporated in a vacuum, the residue diluted with ethyl acetate and the organic phase shaken with a 5% acetic acid. The acid, aqueous solution is made alkaline with $NaHCO_3$ and extracted with ethyl acetate, the solution dried over sodium sulphate and evaporated. By chromatographing the evaporation residue on aluminium oxide and crystallization from aqueous acetone 9,10-dihydro-(+)-ergotamine results in the form of prisms having a melting point of 239–240°, $[\alpha]_D^{20} = -63°$ ($c=0.2$ in pyridine).

Example 4.—A stereoisomer alkaloid of 9,10-dihydro-(+)-ergotamine 10 g. of 9,10-dihydro-(+)-lysergic acid chloride hydrochloride are dissolved in 150 cc. of pyridine at −30° and 8 g. of 2-amino-2-methyl-5-benzyl-10b-hydroxy-3,6-dioxo - octahydro - oxazolo[3,2-a]pyrrolo[2,1-c]pyrazine hydrochloride (isomer B) are added. The mixture is slowly heated to room temperature and then stirred for a further hour. The solvent is evaporated in a vacuum and the residue divided between methyl chloride and a sodium bicarbonate solution. The evaporation residue of the organic phase is purified by chromatography on aluminium oxide using chloroform containing increasing quantities of alcohol. A fraction which crystallizes from acetone in the shape of colourless needles having a melting point of 190–198° is eluted with $CHCl_3$ containing 1% of alcohol. $[\alpha]_D^{20} = -51°$ ($c=1$ in pyridine). This base having an empirical formula of $C_{35}H_{37}O_5N_5$ is a stereoisomer of 9,10-dihydro-(+)-ergotamine.

Example 5.—2 - amino-2-ethyl-5-benzyl-10b-hydroxy-3,6-dioxo-octahydro-oxazolo[3,2-a]pyrrolo[2,1-c]pyrazine-chlorohydrate (a) *2-(2-benzyloxy-2-ethyl-0-ethyl-malonyl)-3-benzyl-1,4 - diketo - octahydro-pyrrolo[1,2-a]-pyrazine.*—A solution of 92.5 g. of 3-benzyl-1,4-diketo-octahydro-pyrrolo [1,2-a]-pyrazine (produced from L-phenylalainine and L-proline) in 580 cc. of absolute pyridine is cooled to −30° and 95.5 g. of 2-benzyloxy-2-ethyl-malonic acid chloride monoethyl ester are added dropwise whilst stirring. The reaction is left to stand for 15 hours at 0° and 100 cc. of water are added, the mixture is stirred for a further half hour at 0° and then poured onto ice, made acid and extracted a number of times with ethylene chloride. The organic extracts are washed consecutively with a 2 N hydrochloric acid, water and a concentrated sodium bicarbonate solution, dried with sodium sulphate and the solvent removed in a vacuum. The residue is taken up in ether, the ethereal solution washed well a number of times with water, dried again and evaporated in a vacuum, the 2-(2-benzyloxy-2-ethyl-0-ethyl-malonyl)-3 - benzyl-1,4-diketo-octahydro-pyrrolo[1,2-a]pyrazine resulting as a light yellow oil. This is a diastereiosomer mixture of the D,L,L- and L,L,L-compound as the optically active 3-benzyl-1,4-diketo-octahydro-pyrrolo[1,2-a]-pyrazine was converted with D,L-2-benzyloxy-2-ethyl-malonic acid chloride monoethyl ester. The two isomers may be separated by chromatography on silica gel with a mixture of chloroform containing 0.5% of methanol. However, it is advantageous to convert the mixture further as the two isomer cycloesters of the following stage may be separated by crystallization.

(b) *2 - ethoxycarbonyl-2-ethyl-5-benzyl-10b-hydroxy-3,6 - dioxo - octahydro-oxazolo[3,2-a]pyrrolo[2,1-c]pyrazine.*—A solution of 146 g. of 2-(2-benzyloxy-2-ethyl-0 - ethyl-malonyl)-3-benzyl-1,4-diketo-octahydro-pyrrolo-[1,2-a]-pyrazine in 500 cc. of glacial acetic acid is added to a suspension of 145 g. of pre-hydrogenated palladium (5%) of aluminium oxide in 500 cc. of glacial acetic acid. By shaking overnight in an atmosphere of hydrogen approximately 10 litres of hydrogen are taken up. The catalyst is then filtered off and the solution evaporated in a vacuum. The oily residue is taken up in ethylene chloride, the solution washed a number of times with water and dried over sodium sulphate. After evaporation of the solvent a colourless oil results from which the 2-ethoxycarbonyl - 2 - ethyl-5-benzyl-10b-hydroxy-3,6-dioxo-octahydro - oxazolo[3,2-a]pyrrolo[2,1-c]pyrazine, isomer B, crystallizes upon the additions of a little ethyl acetate. Melting point 186–187°, $[\alpha]_D^{20}=-54°$ ($c=0.5$ in pyridine). The mother liquor is again evaporated so that an oil forms and recrystallizes from a little ethyl acetate. Isomer A, melting point 163–165°, $[\alpha]_D^{20}=-10°$ ($c=0.5$ in pyridine).

(c) *2 - carboxy - 2 - ethyl-5-benzyl-10b-hydroxy-3,6-dioxo - octahydro - oxazolo[3,2 - a]pyrrolo[2,1 - c]pyrazine.*—65 cc. of a 1 N sodium hydroxide solution are added to 10 g. of 2-ethoxycarbonyl-2-ethyl-5-benzyl-10b-hydroxy - 3,6 - dioxo - octahydro-oxazolo[3,2-a]pyrrolo[2,1-c]pyrazine. The clear solution is left to stand at room temperature for two hours and 65 cc. of a 1 N hydrochloric acid are added whilst cooling with ice and the mixture left to crystallize at 0°. 2-carboxy-2-ethyl-5-benzyl - 10b - hydroxy-3,6-dioxo-octahydro-oxazolo[3,2-a]pyrrolo[2,1-c]pyrazine results. Isomer A: melting point 137–139°, $[\alpha]_D^{20}=-4°$ ($c=0.6$ in pyridine). Isomer B: melting point 208–210° (decomposition), $[\alpha]_D^{20}=-47°$ ($c=0.5$ in pyridine).

(d) *2 - chlorocarbonyl - 2 - ethyl-5-benzyl-10b-hydroxy-3,6 - dioxo - octahydro-oxazolo[3,2-a]pyrrolo[2,1-c]pyrazine.*—1.115 g. of sodium and then 17.4 g. of 2-carboxy-2 - ethyl - 5 - benzyl-10b-hydroxy-3,6-dioxo-octahydro-oxazolo[3,2-a]pyrrolo[2,1-c]pyrazine are dissolved in 224 cc. of absolute methanol whilst cooling with ice until the solution is clear and the solution is then evaporated to dryness in a vacuum. The residue is dried in a high vacuum for 1 hour at 100° and suspended in 150 cc. of oxalyl chloride whilst cooling with ice and the dispersion then stirred well at 0° for half an hour and at room temperature for 1 hour. The excess oxalyl chloride is then distilled off in a vacuum, the residue taken up in absolute methylene chloride, the solution filtered, again evaporated to dryness and the resulting 2-chlorocarbonyl-2 - ethyl - 5 - benzyl-10b-hydroxy-3,6-dioxo-octahydro-oxazolo[3,2-a]pyrrolo[2,1-c]pyrazine recrystallized from ether. Isomer A: melting point 117–118°, $[\alpha]_D^{20}=+40°$ ($c=0.75$ in CHCl$_3$). Isomer B: melting point 157°, $[\alpha]_D^{20}=+20°$ ($c=0.5$ in CHCl$_3$).

(e) *2 - azidocarbonyl - 2-ethyl-5-benzyl-10b-hydroxy-3,6 - dioxo - octahydro-oxazolo[3,2-a]pyrrolo[2,1-c]pyrazine.*—12 g. of 2-chlorocarbonyl-2-ethyl-5benzyl-10b-hydroxy - 3,6 - dioxo - octahydro-oxazolo[3,2-a]pyrrolo[2,1-c]pyrazine are dissolved in 500 cc. of acetone and a solution of 2.58 g. of sodium azide in 8 cc. of water is added dropwise whilst stirring. The reaction mixture is then stirred vigorously for 1 hour, the solution evaporated in a vacuum, the residue stirred into 1000 cc. of water and the aqueous solution extracted with methylene chloride. After evaporation of the solvent the 2-azidocarbonyl - 2 - ethyl - 5 - benzyl-10b-hydroxy-3,6-dioxo - octahydro - oxazolo[3,2-a]pyrrolo[2,1-c]pyrazine results. Isomer A: melting point approximately 160° (decomposition), Isomer B: melting point approximately 118–120° (decomposition), $[\alpha]_D^{20}=+23°$ ($c=0.9$ in CHCl$_3$).

(f) *2 - benzyloxycarbonyl - amino - 2 - ethyl-5-benzyl-10b - hydroxy - 3,6 - dioxo-octahydro-oxazolo[3,2-a]pyrrolo[2,1 - c]pyrazine.*—872 mg. of 2 - azidocarbonyl-2-ethyl - 5 - benzyl - 10b - hydroxy-3,6-dioxo-octahydro-oxazolo[3,2-a]pyrrolo[2,1-c]pyrazine in 5 cc. of absolute benzyl alcohol are heated for 5 minutes to 130° accompanied by a strong evolution of nitrogen. The excess benzyl alcohol is subsequently evaporated in a high vacuum and the residue recrystallized from ether. Isomer A: melting point 198–200°, $[\alpha]_D^{20}=+16°$, ($c=0.3$ in pyridine), Isomer B, melting point 210–212°.

(g) *2 - amino - 2 - ethyl-5-benzyl-10b-hydroxy-3,6.dioxo - octahydro - oxazolo[3,2 - a]pyrrolo[2,1-c]pyrazine-chlorohydrate.*—A solution of 11 g. of 2-benzyloxycarbonyl - amino - 2 - ethyl - 5 - benzyl-10b-hydroxy-3,6-dioxo - octahydro - oxazolo[3,2-a]pyrrolo[2,1-c]pyrazine in 200 cc. of a mixture of equal parts of methanol and methylene chloride containing 8 cc. of a methanolic hydrochloric acid (360 mg. HCl per cc.) is added to a suspension of 24 g. of 5% pre-hydrogenated palladium on aluminium oxide in 96 cc. of absolute methanol containing 40 cc. of methylene chloride. The reaction mixture is shaken for 45 minutes at room temperature in an atmosphere of hydrogen, 540 cc. of hydrogen being used. The catalyst is filtered off from the resulting colourless solution, the mixture evaporated in a vacuum and the residue taken up in ether, the chlorohydrate of the amine precipitating as an amorphous powder. The latter is washed three times with absolute ether and then dried over phosphorus pentoxide. The hydrochloride of the 2 - amino - 2 - ethyl-5-benzyl-10b-hydroxy-3,6-dioxo-octahydro - oxazolo[3,2-a]pyrrolo[2,1-c]pyrazine chlorohydrate results.

*Example 6.—Ergostine and ergostinine*

1 g. of 2-amino-2-ethyl-10b-hydroxy-5-benzyl-3,6-dioxo - octahydro - oxazolo[3,2-a]pyrazine-hydrochloride (isomer A) and 1 g. of lysergic acid chloride hydrochloride are suspended in 50 cc. of a mixture of chloroform and tertiary butanol (3:1) and a solution of 11 cc. pyridine added dropwise thereto whilst cooling, the mixture stirred for half an hour, the cooling bath removed and the mixture stirred for a further 1½ hours at room temperature. The dark brown solution is diluted with 40 cc. of a saturated soda solution and 40 cc. of chloroform and stirred for ¼ hour. For the purpose of working up the solution it is further diluted with 60 cc. of chloroform and 40 cc. of water, shaken well and the two phases separated. The aqueous phase is extracted a further four times with chloroform and the chloroform solutions washed once with water, dried with sodium sulphate and the solvent removed. Benzene is added to the brown crude product which still contains some pyridine, the benzene is then sucked off and the residue subsequently dried in a high vacuum. This crude product is then chromatographed on a 35-fold quantity of silica gel Merck.

The ergostinine is washed into the filtrate by means of a mixture of methylene chloride containing 0.5–1% of methanol. The combined eluates are evaporated and the residue recrystallized from acetone: colourless needles, melting point 215–216° (decomposition). $[\alpha]_D^{20}=+430°$ ($c.=1.15$ in pyridine). $[\alpha]_D^{20}=+367°$ ($c.=1.0$ in CHCl$_3$). Keller's colour reaction: blue turning green after 2-3 minutes. The ergostine is eluated from the column with methylene chloride containing 2% of methanol and is then recrystallized from aqueous acetone for the purpose of further purification. Well defined prisms having a melting point of 211-212° (decomposition) result. $[\alpha]_D^{20}=-35°$ ($c.=0.7$ in pyridine). $[\alpha]_D^{20}=-168°$ ($c.=1.6$ in $CHCl_3$). Keller's colour reaction: blue, turning green after 15-20 seconds. Neutral tartrate: melting point 188-191° (decomposition).

Acid maleate: melting point 191-192° (decomposition).

*Example 7.—9,10-dihydro-ergostine*

10 g. of 2-amino-2-ethyl-10b-hydroxy-5-benzyl-3,6-dioxo - octahydro - oxazolo[3,2 - a]pyrrolo[2,1 - c]pyrazine chlorohydrate (isomer A) and 10 g. of 9,10-dihydrolysergic acid chloride hydrochloride are suspended in 300 cc. of methylene chloride and a solution of 16 g. of pyridine in 300 cc. of methylene chloride are added thereto at 0° whilst stirring vigorously. After stirring for 15 minutes at room temperature the solvent is evaporated in a vacuum, the residue taken up in ethyl acetate and shaken with a 2% aqueous tartaric acid solution. The acid aqueous extract is made alkaline with sodium bicarbonate and shaken with ethyl acetate. The ethyl acetate extract is evaporated after being dried with sodium sulphate and the residue taken up in 300 cc. of hot acetone. 9,10-dihydro-ergostine crystallized from this solvent in the form of needles which are recrystallized from a 40-fold quantity of hot methanol for the purpose of purifiication. Melting point 224-226° (decomposition). $[\alpha]_D^{20}=-59°$ ($c.=1.8$ in pyridine). $[\alpha]_D^{20}=-30°$ ($c.=0.8$ in chloroform). Keller's colour reaction: violet blue, stable. Neutral tartrate: crystallizes from methanol upon dilution with water in the form of massive prisms having a melting point of 201-203° (decomposition). Acid maleate: crystallizes from methanol in prisms having a melting point of 203-205° (decomposition).

*Example 8.—2 - amino - 2 - methyl - 10b - hydroxy - 5-isobutyl - 3,6 - dioxo - octahydro - oxazolo[3,2-a]pyrrolo[2,1-c]pyrazine-chlorohydrate*

(a) *N-carbobenzoxy-L-prolyl-L-leucine methylester.—* A solution of 45 g. (0.22 mol) of dicyclohexylcarbodiimide in 50 ml. of absolute ether is added dropwise to a solution of 29 g. (0.2 mol) of L-leucine methylester and 50 g. (0.2 mol) of N-carbobenzoxy-L-proline in 50 ml. of methylene chloride and 100 ml. of absolute ether whilst stirring at 20°. Subsequently the reaction mixture is heated to the boil at reflux for one hour. The excess of dicyclohexyl-carbodiimide is decomposed with 2 ml. of glacial acetic acid and the separated dicyclehexyl urea filtered off. The filtrate is first washed with a $NaHCO_3$ solution and then with water, dried with $Na_2SO_4$ and the solvent removed. The crude product which results is crystallized from benzene/heptane and yields N-carbobenzoxy-L-prolyl-L-leucine methylester in the form of colourless pointed rodlets having a melting point of 76-77°.

(b) *3 - isobutyl - 1,4 - dioxo - octahydro - pyrrolo[1,2-a]pyrazine.—*69 g. (0.183 mol) of N-carbobenzoxy-L-prolyl-L-leucine methylester are hydrogenated in 750 ml. of absolute methanol with 25 g. of prehydrogenated palladium catalyst on aluminium oxide (5% Pd) at room temperature and normal pressure. After three hours the taking up of hydrogen is completed, the catalyst filtered off and the solvent removed in a vacuum. 41.8 g. of oily L-prolyl-L-leucine-methylester result and this is cyclized in a vacuum at 120° during the course of 2½ hours to yield L-leucyl-L-proline-lactam. The crude product is crystallized by heating and then purified by recrystallization from ethyl acetate to yield L-leucyl-L-proline-lactam having a melting point of 144-146°. $[\alpha]_D^{20}=+91.4°$ ($c.=1$ in water).

(c) *2 - (2 - benzyloxy - 2 - methyl - 0 - ethyl - malonyl) - 1,4 - diketo - 3 - isobutyl - octahydro - pyrrolo [1,2-a]pyrazine.—*10.5 g. (50 millimol) of L-leucyl-L-proline-lactam are suspended in 6 ml. of absolute dioxane, 3.95 g. (50 millimol) of absolute pyridine are first added and then 13.5 g. (50 millimol) of (S)-(+)-2-methyl-2-benzyloxy-malonic acid ethylester chloride. The mixture is then heated to 70° for 1½ hours whilst stirring. After cooling, the reaction mixture is diluted with ether and ice cold 2 N HCl, is then extracted with ice water in a $NaHCO_3$ solution and again with ice water. The ethereal solutions are dried thoroughly with $Na_2SO_4$ and the solvent carefully removed. 20.5 g. of a honey-like, unstable crude product, which eventually crystallizes, results as a residue. Melting point undefined at approximately 80°.

(d) *2 - ethoxycarbonyl - 2 - methyl - 10b - hydroxy-5 - isobutyl - 3,6 - dioxo - octahydro - oxazolo[3,2 - a] pyrrolo[2,1-c]pyrazine.—*20.5 g. of crude 2-(2-benzyloxy-2 - methyl - 0 - ethyl - malonyl) - 1,4 - diketo - 3 - isobutyl-octahydro-pyrrolo[1,2-a]pyrazine are hydrogenated in 250 ml. of fine spirit with 10 g. of a palladium on activated charcoal (5% Pd) as catalyst at 20° and at normal pressure. After 20 hours the theoretical quantity of hydrogen is taken up whereupon the hydrogenation ceases. The catalyst is filtered off and the solvent removed in a vacuum. The 15.5 g. of oily residue crystallizes upon standing. 2-ethoxycarbonyl-2-methyl-10b-hydroxy - 5 - isobutyl - 3,6 - dioxo - octahydro - oxazolo [3,2-a]pyrrolo[2,1-c]pyrazine is recrystallized from isopropyl ether/heptane in the form of rod-like crystals having a melting point of 100-101°. $[\alpha]_D^{20}=-21°$ ($c.=1$ in ethanol).

(e) *2-carboxy - 2 - methyl - 10b - hydroxy - 5 - isobutyl - 3,6 - dioxo-octahydro-oxazolo[3,2-a]pyrrolo[2,1-c]pyrazine.—*15.3 g. of crude 2-ethoxycarbonyl-2-methyl-10b - hydroxy - 5 - isobutyl - 3,6 - dioxo-octahydro-oxazolo[3,2-a]pyrrolo[2,1-c]pyrazine are dissolved in 10 ml. of methyl alcohol and 100 ml. of 1 N NaOH solution added whilst cooling. The mixture is left to stand for 2½ hours at 20° and is then extracted twice with ether so as to remove the non-saponified components, the aqueous-methanolic solution is then filtered through active charcoal and the filtrate acidified with 60 ml. of 2 N HCl. The resulting crystalline 2-carboxy-2-methyl-10b-hydroxy-5 - isobutyl - 3,6 - dioxo - octahydro - oxazolo[3,2-a] pyrrolo[2,1-c]pyrazine is recrystallized a number of times from methanol yielding colourless needles having a melting point of 192-193°. $[\alpha]_D^{20}=-25.5°$ ($c=1$ in pyridine)

(f) *2 - chlorocarbonyl - 2 - methyl - 10b - hydroxy-5-isobutyl - 3,6 - dioxo - octahydro-oxazolo[3,2 - a]pyrrolo [2,1-c]pyrazine.—*9.8 g. (30 millimol) of finely pulverized 2 - carboxy - 2 - methyl-10b-hydroxy-5-isobutyl-3,6-dioxo - octahydro - oxozolo[3,2-a]pyrrolo[2,1-c]pyrazine dried in a high vacuum and 18.7 g. of freshly sublimated finely pulverized phosphorus pentachloride are suspended in 200 ml. of absolute ether and stirred well for 2 hours. The precipitate is filtered off with suction, the filter residue washed well wtih absolute ether and dried in a high vacuum. 2 - chlorocarbonyl - 2 - methyl-10b-hydroxy - 5 - isobutyl - 3,6 - dioxo - octahydro - oxazolo[3,2-a]pyrrolo-[2,1-c]pyrazine having a melting point of 146-147° results.

(g) *2 - azidocarbonyl - 2 - methyl - 10b - hydroxy - 5-isobutyl - 3,6 - dioxo - octahydro - oxazolo[3,2-a]pyrrolo-[2,1-c]pyrazine.—*A concentrated aqueous solution of 2.65 g. sodium azide is added dropwise to a solution of 9.3 g. of crude 2 - chlorocarbonyl - 2 - methyl-10b-hydroxy-5-isobutyl - 3,6 - dioxo octahydro oxazolo[3,2-a]pyrrolo-[2,1-c]pyrazine in 150 ml. of acetone at room temperature. The mixture is then stirred for 2 hours at 20° and the major portion of the acetone removed in a vacuum without heating. The residue is shaken between methylene chloride and sodium bicarbonate solution. The methylene chloride is removed in a vacuum at 20° and the crude azide suspended in ether, the ether filtered off and the residue, the crude 2-azidocarbonyl-2-methyl-10b-hydroxy - 5 - isobutyl - 3,6 - dioxo - octahydro-oxazolo[3,2-a]pyrrolo[2,1-c]pyrazine is immediately processed further after carefully drying in a high vacuum at 20°, without further purification.

(h) 2 - benzyloxycarbonyl - amino - 2 - methyl-10b-hydroxy - 5 - isobutyl -3,6 - dioxo - octahydro-oxazolo [3,2-a]pyrrolo[2,1-c]pyrazine.—4.5 g. of crude 2-azidocarbonyl - 2 - methyl-10b-hydroxy-5-isobutyl-3,6-dioxo-octahydro-oxazolo[3,2-a]pyrrolo[2,1-c]pyrazine and 2.76 g. of absolute benzylalcohol are heated to boil at reflux in 30 ml. of absolute chloroform for 1½ hours, the volatile components of the reaction mixture removed in a vacuum and the residue recrystallized from methylene chloride/ethyl acetate, yielding crystalline 2-benzyloxycarbonyl amino - 2 - methyl - 10b - hydroxy - 5 - isobutyl 3,6-dioxo - octahydro - oxazolo[3,2 - a]pyrrolo[2,1 - c] pyrazine in the form of rodlets having a melting point of 212–213° (decomposition). $[\alpha]_D^{20}=+19.1°$ ($c=2$ in ethanol).

(i) 2-amino-2-methyl - 10b - hydroxy - 5 - isobutyl-3,6-dioxo - octahydro - oxazolo[3,2-a]pyrrolo[2,1-c]pyrazine chlorohydrate.—1.0 g. (2.3 millimol) of 2 benzyloxycarbonyl - amino - 2 - methyl - 10b-hydroxy-5-isobutyl-3,6-dioxo - octahydro - oxazolo[3,2-a]pyrrolo[2,1-c]pyrazine in 75 ml. of methanol containing 7.4 millimol of gaseous HCl, is hydrogenated with 2 g. of prehydrogenated palladium catalyst on activated charcoal (5% Pd 22 ml. of hydrogen are taken up within 2 minutes whereupon the hydrogenation ceases. The mixture is stirred for a further 15 minutes to make sure that no further hydrogen is taken up. The catalyst is then filtered off and the filtrate concentrated to approx. 30 ml. at 20°, whereupon scratching with a glass rod causes crystallization to commence. So as to obtain the maximum yield of hydrochloride the mixture is diluted with absolute ether to a volume of approx. 200 ml. After filtering off the crystals and drying in a high vacuum the 2 - amino-2-methyl-10b-hydroxy - 5 - isobutyl - 3,6 - dioxo - octahydro - oxazolo-[3,2-a]pyrrolo[2,1-c]pyrazine chlorohydrate results in the form of microscopically small rodlets pointed at both ends and having a melting point of 192–193° (decomposition).

Example 9.—Ergosine an ergosinine 0.5 g. (1.5 millimol) of 2-amino-2-methyl-10b-hydroxy-5 - isobutyl - 3,6 - dioxo - octahydro-oxazolo[3,2-a]pyrrolo[2,1-c]pyrazine chlorohydrate and 1.0 g. of lysergic acid chloride hydrochloride (3.1 millimol) are suspended in 10 ml. of absolute methylene chloride and cooled to 0°. 5.5 ml. of absolute pyridine are added at once to this suspension and the reaction mixture stirred for a further ½ hour at 0°. The ice bath is then removed and the mixture heated to room temperature and stirred for a further 1½ hours at 20°. 20 ml. of a saturated soda solution and 20 ml. of chloroform are added to the dark brown solution and the mixture is stirred for a further 15 minutes. The mixture is then diluted with 30 ml. of chloroform and 20 ml. of water and the two phases separated from each other by means of a separating funnel. The aqueous solution is subsequently extracted a further three times with chloroform, the chloroform solution boiled once with water, dried well and the solvent removed. After removal of the pyridine in a high vacuum 1.0 g. of a dark resin result, this is dissolved in methanol, filtered through active charcoal and evaporated once more. The remaining residue is chromatographed on 30 g. of dry silica gel Merck. A solution of methylene chloride containing 0.7 to 1% of methanol is used for the elution. After crystallizing the eluate twice from methanol, pure ergosinine results in the form of colourless needles having a melting point of 190–191° (decomposition). Upon admixture with natural ergosinine no depression of melting point was observed. $[\alpha]_D^{20}=+390°$ ($c=0.5$ in chloroform). The synthetic product and the natural ergosinine behaved identically when tested with thin layer chromatography both on aluminum oxide and silica gel plates in various solvent systems. The IR spectra, taken in Nujol suspension and in a methylene chloride solution, again showed the two compounds to be identical. UV spectra $\lambda_{max}$ 242 m$\mu$, (log $\epsilon$ 4.23) and 309 m$\mu$, (log $\epsilon$ 3.93). Minimum at 269.5 m$\mu$.

After eluting some mixed fractions of ergosinine and ergosine with methylene chloride containing 1.5% of methanol, practically pure ergosine is iluted with methylene chloride containing 2% of methanol. By recrystallizing twice from methyl acetate, colourless rectangular plates having a melting point of 224–225° (decomposition) result. The crystals have the same shape as natural ergosine and admixture with authentic ergosine caused no depression of the melting point $[\alpha]_D^{20}=-155°$ ($c=0.45$ in chloroform). The synthetic product and the natural ergosine and admixture with authentic ergosine caused no raphy both on silica gel and aluminum oxide plates. UV spectra: $\lambda_{max}$ 239.5 m$\mu$ (log $\epsilon$ 4.33) and 312 m$\mu$ (log $\epsilon$ 3.97). Minimum at 234 and 269.5 m$\mu$. The IR spectra, which were taken in methylene chloride and in Nujol and the NMR spectra, taken in CHCl$_3$ were also identical for the two compounds.

*L-di-para-tolyl-tartrate of synthetic ergosine:* microscopically small, rectangular crystals having a melting point of 199–200°. A mixture of the synthetic and the authentic compound has a melting point of 199–200°, $[\alpha]_D^{20}=-62°$ ($c=0.5$ in ethanol).

Example 10.—2-amino-2-methyl-5-isopropyl-10b-hydroxy-3,6 - dioxo - octahydro - oxazolo[5,2-a]pyrrolo[2,1-c] pyrazine hydrochloride (a) N-benzyloxycarbonyl - L - prolyl-L-valine methyl ester.—98.4 g. (0.75 mols) of L-valine methyl ester (boiling point 60°/11 mm. of Hg) and 187.5 g. (0.75 mols) of N-benzyloxycarbonyl-L-proline are dissolved in 750 ml. of absolute ether and 171.0 g. (0.83 mols) of N,N'-dicyclohexyl-carbodiimide in 250 ml. of absolute ether are added dropwise whilst stirring well during the course of half an hour, whereby the temperature slowly rises to 35° and a precipitate of N,N'-dicyclohexyl-urea results. Heating to the boil is subsequently effected for one hour, the reaction mixture is then cooled and precipitated N,N'-dicyclohexyl-urea is filtered off. In order to remove unreacted starting materials the filtrate which has been diluted with ether is first washed twice with a N sodium bicarbonate solution, each time with 500 ml., then twice with the same amount of a N hydrochloric acid and finally with water until neutral. After subsequently extracting the aqueous phases twice, each time with 1 litre of ether, the ethereal solutions are dried and the solvent is evaporated, whereby a colourless, viscous oil, $n^{20}_D=1.5115$, results, which is further worked up without additional purification, as the N-benzyloxycarbonyl-L-prolyl-L-valine methyl ester cannot be crystallized.

(b) 1,4-dioxo - 3-isopropyl-octahydro-pyrrolo[1,2-a] pyrazine.—25.5 g. (0.070 mols) of crude N-benzyloxycarbonyl-L-prolyl-L-valine methyl ester are hydrogenated with 10 g. of a palladium/charcoal catalyst (5% of palladium) in 150 ml. of ethyl acetate and 100 ml. of glacial acetic acid. After the taking up of hydrogen diminishes the hydrogenating flask is evacuated and hydrogenation is continued, whereby hydrogen is again taken up. A total of 1360 ml. of hydrogen is taken up. When hydrogen is no longer taken up, the catalyst is filtered off, the solvent is removed and the oily residue is heated in a high vacuum for 4 hours to 120–130°, whereby crystallization occurs after approximately one hour. After recrystallization from ethyl acetate pure 1,4-dioxo-3-isopropyl-octahydro-pyrrolo[1,2-a]pyrazine, having a melting point of 190–192°, is obtained in the form of colourless needles, $[\alpha]_D^{20} = -159°$ ($c = 0.7$ in ethanol).

(c) *2-(2 - benzyloxy-2-methyl-0-ethyl-malonyl)-1,4-dioxo-3-isopropyl - octahydro-pyrrolo[1,2-a]pyrazine.*—58.8 g. (0.3 mols) of 1,4-dioxo-3-isopropyl-octahydro-pyrrolo[1,2-a]pyrazine are suspended in 40 ml. of absolute dioxane and 23.7 g. (0.3 mol) of absolute pyridine are added thereto. 81 g. (0.3 mols) of methyl-benzyloxy-malonic acid semi-ester chloride are added dropwise to the mixture at $+10°$ during the course of 10 minutes and heating is subsequently effected to 70° for 1½ hours whilst stirring. After cooling the reaction mixture is poured on ice, an excess of a 2 N hydrochloric acid is added and extraction is effected three times with ether. The ethereal solutions are first washed with a sodium bicarbonate solution and then with water. After drying the ether solution with sodium sulphate and removing the solvent a crystalline crude product is obtained which is recrystallized from ether and yields 2-(2-benzyloxy-2-methyl - 0 - ethyl-malonyl)-1,4-dioxo-3-isopropyl-octahydro-pyrrolo[1,2-a]pyrazine having a melting point of 110–111°. Further portions of acylation product, having a melting point of 104–105°, may be obtained from the mother liquors by repeated crystallization. $[\alpha]_D^{20} = +138°$ (in ethanol).

(d) *2-ethoxycarbonyl - 2 - methyl-5-isopropyl-10b-hydroxy-3,6-dioxo-octahydro-oxazolo[3,2 - a]pyrrolo[2,1-c]pyrazine.*—20 g. (46.5 millimols) of 2-(2-benzyloxy-2-methyl - 0 - ethyl-malonyl)-1,4-dioxo-3-isopropyl-octahydro-pyrrolo[1,2-a]pyrazine are hydrogenated at 20° and normal pressure in 200 ml. of absolute ethyl acetate and 20 g. of prehydrogenated palladium on active charcoal (5% of palladium) as catalyst. After the theoretical amount of hydrogen has been taken up (approximately 15 hours) hydrogenation stops. The catalyst is then filtered off, the residue is washed well with ethyl acetate and the solvent is removed in a vacuum. After repeated recrystallization from isopropyl ether pure 2-ethoxycarbonyl-2-methyl - 5 - isopropyl-10b-hydroxy-3,6 - dioxo-octahydro-oxazolo[3,2-a]pyrrolo[2,1-c]pyrazine having a melting point of 104–105°, is obtained. $[\alpha]_D^{20} = -7°$ ($c = 2$ in ethanol). Ultraviolet spectrum $\lambda_{max} = 200.5$ m$\mu$ (log $\epsilon = 4.17$ in ethanol).

(e) *2 - carboxy - 2 - methyl - 5 - isopropyl - 10b -hydroxy - 10b - hydroxy - 3,6 - dioxo-octahydro-oxazolo[3,2-a]pyrrolo[2,1-c]pyrazine.*—52.5 g. (0.154 mols) of finely pulverized 2-ethoxycarbonyl-2-methyl-5-isopropyl-10b - hydroxy - 3,6 - dioxo-octahydro-oxazolo[3,2-a]-pyrrolo[2,5-c]pyrazine are dissolved at room temperature in 230 ml. of a N sodium hydroxide and left to stand for 2 hours. In order to liberate the 2-carboxy-2-methyl-5-isopropyl - 10b - hydroxy - 3,6 - dioxo-octahydro-oxazolo-[3,2-a]pyrrollo[2,1-c]pyrazine which results, acidification is effected with 60 ml. of a 4 N hydrochloric acid, whereby the acid, which is already almost analytically pure, crystallizes out. After filtration the residue is recrystallized once more from methanol/water: colourless needles having a melting point of 187–188°, $[\alpha]_D^{20} = -16.5°$ ($c = 2.2$ in pyridine). Ultraviolet spectrum: $\lambda_{max} = 201$ m$\mu$ (log $\epsilon = 4.16$ in ethanol).

(f) *2 - chlorocarbonyl - 2 - methyl - 5 - isopropyl - 10b-hydroxy - 3,6 - dioxo-octahydro-oxazolo[3,2-a]pyrrolo-[2,1-c]pyrazine.*—15.6 g. (50 millimols) of finely pulverized 2 - carboxy - 2 - methyl - 5 - isopropyl - 10b - hydroxy - 3,6 - dioxo-octahydro-oxazolo[3,2-a]pyrrolo[2,1-c]pyrazine are suspended in 250 ml. of absolute ether and a total of 20.8 g. of freshly sublimated phosphorus pentachloride is added portionwise to the suspension. The reaction mixture is subsequently stirred at room temperature for 1½ hours and the precipitated residue of the acid chloride is filtered off from the ether solution, is washed well with absolute ether and dried at 20° in a high vacuum: 2 - chlorocarbonyl - 2 - methyl - 5 - isopropyl - 10b - hydroxy - 3,6 - dioxo-octahydro-oxazolo[3,2-a]pyrrolo[2,1-c]pyrazine, melting point 133–134° (decomposition), $[\alpha]_D^{20} = +18°$ ($c = 1$ in CHCl$_3$).

(g) *2 - azidocarbonyl - 2 - methyl - 5 - isopropyl - 10b-hydroxy - 3,6 - dioxo-octahydro-oxazolo[3,2-a]pyrrolo-[2,1-c]pyrazine.*—18.7 g. (56.5 millimols) of 2-chlorocarbonyl - 2 - methyl - 5 - isopropyl - 10b - hydroxy - 3,6 - dioxo-octahydro-oxazolo[3,2 - a]pyrrolo[2,1 - c]pyrazine are dissolved at room temperature in absolute acetone which is free of methanol and 7.3 g. of sodium azide in 18 ml. of water are added to the solution, whereby a portion of the sodium azide crystallizes out again on combining the two solutions. The suspension is stirred at 20° for half an hour and is subsequently concentrated almost to dryness at 20° in a rotatory evaporator. The residue is shaken out between an ice cold sodium bicarbonate solution and methylene chloride and the bicarbonate solution is extracted a further twice with methylene chloride. The methylene chloride solution of 2-axido-carbonyl-2-methyl - 5 - isopropyl - 10b - hydroxy - 3,6 - dioxo-octahydro-oxazolo[3,2 - a]pyrrolo[2,1 - c]pyrazine is washed once with ice water, dried well and the solvent is removed in a vacuum at 20° as the azide is liable to decompose. Crystalline 2 - azidocarbonyl - 2 - methyl - 5 - isopropyl-10b - hydroxy - 3,6 - dioxo-octahydro-oxazolo[3,2-a]pyrrolo[2,1-c]pyrazine is obtained by recrystallization from methylene chloride/petroleum ether. Fine, cotton wool like needles having a melting point of 98° (decomposition), $[\alpha]_D^{20} = -22°$ ($c = 1$ in CHCl$_3$). Infrared spectrum; most important bands at 3480–3400 (broad) 2250, 2190, 2145, 1721, 1686 and 1650 cm.$^{-1}$ (in methylene chloride).

(h) *2 - N - benzyloxycarbonyl-amino - 2 - methyl -5 - isopropyl - 10b - hydroxy - 3,6 - dioxo-octahydro-oxazolo-[3,2-a]pyrrolo[2,1-c]pyrazine.*—6.5 g. (19.2 millimols) of 2 - azidocarbonyl - 2 - methyl - 5 - isopropyl - 10b - hydroxy - 3,6 - dioxo - octahydro - oxazolo[3,2 - a]pyrrolo-[2,1-c]pyrazine and 6.5 ml. of absolute benzyl alcohol are heated to the boil at reflux in 40 ml. of absolute chloroform for one hour. The reaction mixture is then freed from the readily volatile components and subsequently the major portion of the excess benzyl alcohol is removed in a high vacuum. After recrystallization from ethyl acetate the residue yields 2-N-benzyloxycarbonyl-amino - 2 - methyl - 5 - isopropyl - 10b - hydroxy - 3,6 - dioxo-octahydro-oxazolo[3,2 - a]pyrrolo[2,1 - c]pyrazine having a melting point of 187–188°. For purposes of analysis a sample of the compound is repeatedly recrystallized from ethyl acetate, whereby the melting point reaches 190–191°. Colourless prisms, $[\alpha]_D^{20} = +13°$ ($c = 2$ in ethanol).

(i) *2 - amino - 2 - methyl - 5 - isopropyl - 10b - hydroxy - 3,6 - dioxo - octahydro - oxazolo[3,2 - a]pyrrolo-[2,1-c]pyrazine hydrochloride.*—3.7 g. (8.86 millimols) of 2-N-benzyloxy-carbonyl-amino - 2 - methyl - 5 - isopropyl - 10b - hydroxy - 3,6 - dioxo-octahydro-oxazolo-[3,2-a]pyrrolo[2,1-c]pyrazine are dissolved in 50 ml. of absolute methanol and the solution is added to a suspension of 5 g. of prehydrogenated palladium/active charcoal catalyst (5% of palladium) in 50 ml. of absolute methanol. Directly before hydrogenation 11 ml. of an 11% solution of hydrochloric acid in absolute methanol are added to the mixture and hydrogenation is effected as rapidly as possible. After hydrogenation has been completed, the catalyst is filtered off, the filtrate is concentrated to approximately 20 ml. at approximately 20° and diluted with absolute ether, whereupon 2-amino-2-methyl-5 - isopropyl - 10b - hydroxy - 3,6 - dioxo-octahydro-oxazolo[3,2 - a]pyrrolo[2,1 - c]pyrazine hydrochloride crystallizes rapidly. Filtration is effected, the precipitate is washed well with absolute ether and dried at 20° in a high vacuum: colourless or slightly green coloured microcrystalline powder having a melting point of 163° (decomposition).

What is claimed is:
1. A compound of the formula,

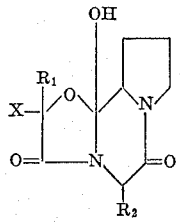

wherein $R_1$ is selected from the group consisting of hydrogen and lower alkyl, $R_2$ is selected from the group consisting of hydrogen, lower alkyl and benzyl, and X is selected from the group consisting of $NH_2$ and COO-lower alkyl.

2. A compound of the formula,

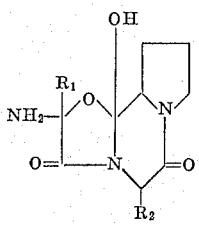

wherein $R_1$ is selected from the group consisting of hydrogen and lower alkyl and $R_2$ is selected from the group consisting of hydrogen, lower alkyl and benzyl.

3. A compound of the formula,

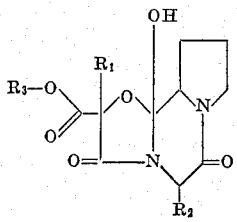

wherein $R_1$ is selected from the group consisting of hydrogen and lower alkyl, $R_2$ is selected from the group consisting of hydrogen, lower alkyl and benzyl and $R_3$ is lower alkyl.

4. 2 - ethoxycarbonyl - 2 - methyl - 5 - benzyl - 10b-hydroxy - 3,6 - dioxo - octahydro - oxazolo[3,2 - a]pyrrolo[2,1-c]pyrazine.

5. 2 - amino - 2 - methyl - 5 - benzyl - 10b - hydroxy-3,6 - dioxo - octahydro - oxazolo[3,2 - a]pyrrolo[2,1-c]pyrazine chlorohydrate.

6. 2 - ethoxycarbonyl - 2 - methyl - 5 - isobutyl - 10b-hydroxy - 3,6 - dioxo - octahydro - oxazolo[3,2 - a]pyrrolo[2,1-c]pyrazine.

7. 2 - amino - 2 - methyl - 5 - isobutyl - 10b - hydroxy-3,6 - dioxo - octahydro - oxazolo[3,2 - a]pyrrolo[2,1 - c]pyrazine chlorohydrate.

8. 2 - ethoxycarbonyl - 2 - ethyl - 5 - benzyl - 10b-hydroxy - 3,6 - dioxo - octahydro - oxazolo[3,2 - a]pyrrolo[2,1-c]pyrazine.

9. 2 - amino - 2 - ethyl - 5 - benzyl - 10b - hydroxy-3,6 - dioxo - octahydro - oxazolo[3,2-a]pyrrolo[2,1-c]pyrazine-chlorohydrate.

10. 2 - ethoxycarbonyl - 2 - methyl - 5 - isoproyl - 10b-hydroxy - 3,6 - dioxo - octahydro - oxazolo[3,2 - a]-pyrrolo[2,1-c]pyrazine.

11. 2-amino - 2 - methyl - 5 - isopropyl - 10b - hydroxy-3,6 - dioxo - octahydro - oxazolo[3,2 - a]pyrrolo[2,1 - c]-pyrazine hydrochloride.

References Cited by the Examiner
UNITED STATES PATENTS 3,084,164 4/1963 Frey _____ 260—268
3,227,719 1/1966 Hoffmann et al. _____ 260—268

OTHER REFERENCES

Chemical Abstracts (I), vol. 58, pages 13969–13970, June 23, 1963 (Abstract of Belgium Patent 617,449 issued November 9, 1962).

Chemical Abstracts (II), vol. 58, pages 14029–14030, June 23, 1963 (Abstract of Belgium Patent 617,451 issued November 9, 1962).

Hoffmann et al. (II), Experimentia, vol. 17, pages 206–207, May 1961.

ALEX MAZEL, *Primary Examiner.*
HENRY R. JILES, J. W. ADAMS,
*Assistant Examiners.*